United States Patent [19]

Terao et al.

[11] 4,385,305
[45] May 24, 1983

[54] RECORDING MEMBER

[75] Inventors: Motoyasu Terao, Hinodemachi; Shinkichi Horigome, Tachikawa; Munehisa Mitsuya, Hachioji; Sakae Ota, Yokohama, all of Japan

[73] Assignee: Hitachi, Ltd., Tokyo, Japan

[21] Appl. No.: 290,562

[22] Filed: Aug. 6, 1981

[30] Foreign Application Priority Data

Aug. 20, 1980 [JP] Japan .................. 55-113509

[51] Int. Cl.³ ............................. G01D 15/34
[52] U.S. Cl. ..................... 346/135.1; 346/76 L; 430/945
[58] Field of Search ............ 346/135.1, 76 L; 430/495

[56] References Cited
U.S. PATENT DOCUMENTS 4,032,691 6/1977 Kido .................. 346/76 L X
4,238,803 12/1980 Terao ................ 346/135.1 X
4,264,911 4/1981 Wilkinson .......... 346/135.1 X
4,296,419 10/1981 Terao .................. 346/135.1
4,318,112 3/1982 Kivits .................. 346/135.1

Primary Examiner—Joseph W. Hartary
Attorney, Agent, or Firm—Antonelli, Terry & Wands

[57] ABSTRACT

Disclosed is a recording member which comprises a substrate and a recording layer containing at least selenium and at least one element selected from the group consisting of tellurium and bismuth, wherein the selenium content is higher in the vicinity of the surface of the recording layer and/or in the vicinity of the interface between the recording layer and the substrate than the average selenium content in other portions. By virtue of the presence of this high selenium content portion, the oxidation resistance and water resistance are improved, and a recording member having stable characteristics can be obtained.

27 Claims, 3 Drawing Figures

RECORDING MEMBER

BACKGROUND OF THE INVENTION

(1) Field of the Invention

The present invention relates to a recording member for recording informations. More particularly, the present invention relates to a recording member having a film which is deformed or removed under irradiation with energy beams to form a concave or hole portion.

(2) Description of the Prior Art

In the field of optical video discs or digital optical discs, development of a recording member in which a large signal-to-noise ratio and a small error rate can be obtained even if an image information of a very high density is recorded has been tried. For example, a film of bismuth (Bi) or tellurium (Te) or a chalcogenide glass film of the arsenic-tellurium type is known as a recording layer to be formed on a disc substrate. In case of a optical video disc, a reproduced signal having a highest quality can be obtained when a film of the As-Te type is used, but in case of a digital optical disc, good characteristics can also be obtained even if a film of Bi or Te is used. Such film can absorb laser beams more easily than films of metals such as Al, and it has a low melting point (softening point), a low boiling point and a low heat conductivity, and therefore, it has a very high recording sensitivity.

These recording films are disclosed in, for example, Japanese Pat. No. 40479/1971 and Japanese Laid-Open Patent Applications Nos. 87304/1975, 42489/1975 and 51733/1975. One of us has already discloses a recording film of the As-Te-Se type in the specification of U.S. Pat. No. 4,238,803.

Since As, Te and Bi are oxidized if they are allowed to stand in air for a long time, they cannot be used stably over a long period. Furthermore, vacuum deposition of As alone cannot be performed stably, and it has been found that when an As-Te type material is used for vacuum deposition, the composition of the vacuum deposition product is changed with the lapse of time and good reproducibility can hardly be obtained at vacuum deposition.

SUMMARY OF THE INVENTION

It is a primary object of the present invention to provide a recording member which is stable and can be produced with good reproducibility.

According to the present invention, this object can be attained by a recording member for recording informations, which comprises a substrate and a recording layer formed on the substrate, which is deformed or removed under irradiation with energy beams, wherein said recording layer contains at least selenium and at least one element selected from the group consisting of tellurium and bismuth and the selenium content is higher in the vicinity of the surface of the recording layer and/or the vicinity of the interface between the recording layer and the substrate than the average selenium content in other portions.

DETAILED DESCRIPTION OF THE PREFERRED EMBODIMENTS

Figure 1:
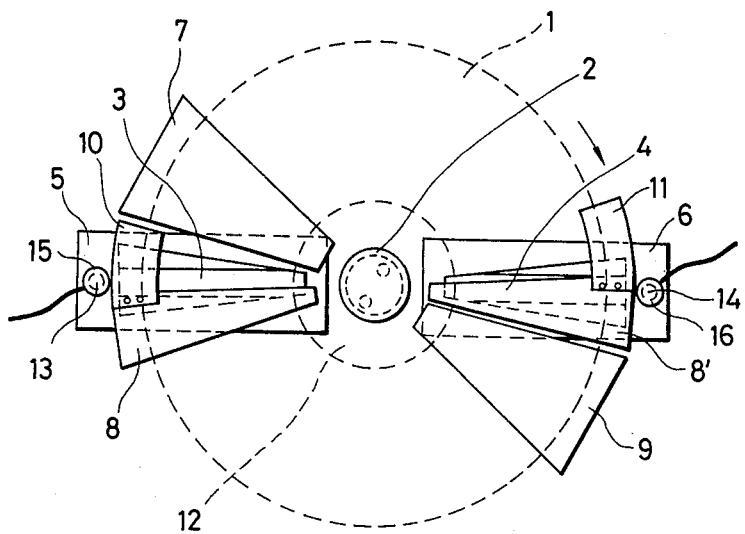
FIG. 1 is a diagram illustrating one embodiment of the vacuum deposition apparatus for forming a recording layer of the recording member of the present invention.

The recording member of the present invention comprises a substrate and a recording layer formed on the substrate, which comprises selenium (Se) and at least one element selected from the group consisting of tellurium (Te) and bismuth (Bi), and this recording member is characterized in that the Se content is higher in the vicinity of the surface of the recording layer and/or the vicinity of the interface between the recording layer and the substrate than the average Se content in other portions.

Since Se is an element which is hardly oxidized, by adoption of the above arrangement, oxidation or other change of Te or Bi in the interior of the recording layer can be prevented even if oxygen or water is intruded from the side of the surface of the recording layer or from the side of the interface between the recording layer and the substrate. Accordingly, even after the recording member has been used for several years, recording and reading can be performed under the same conditions as when the recording member was first used.

Between Te and Bi, Te is preferred as the main component because Te does not form a high-melting-point compound with Se. When a portion having a higher Se content is formed in the vicinity of the surface of the recording layer, better results can be obtained in connection with prevention of the change with the lapse of time than a portion having a higher Se content is formed in the vicinity of the interface between the recording layer and the substrate. However, even if a high Se content portion is formed only in the vicinity of the interface between the recording layer and the substrate, the intended effect can be attained. A highest effect can be obtained when high Se content portions are formed both in the vicinity of the surface of the recording layer and in the vicinity of the interface between the recording layer and the substrate.

The average Se content in the recording layer of the present invention is preferably in the range of from 0.5 atomic % to 30 atomic % and especially preferably in the range of from 10 atomic % to 20 atomic %. It is preferred that the thickness of the high Se content portion be 1 to 5 nm on either substrate side or the surface side and that one or two high Se content portions be formed. The Se content in the high Se content portion is not particularly critical if it is higher than the average Se content in other portions, but it is ordinarily preferred that the Se content in the high Se content portion be 50 to 100 atomic %.

The Se content in portions other than the high Se content portion is preferably higher than 0 atomic % but lower than 29.8 atomic %. In other words, even when Se is not contained in these portions, the stability can be improved if Se is contained in the recording layer on the average.

It is preferred that the change of the composition in the thickness direction be smooth.

The stability can be improved in the recording layer of the present invention by addition of other elements, though formation of the film becomes relatively difficult in this case. Attainment of this effect can be expected by addition of at least one element selected from the group consisting of silicon (Si), germanium (Ge), arsenic (As), thallium (Tl), tin (Sn), lead (Pb), indium (In), antimony (Sb) and tantalum (Ta). It is preferred that the total content of these additive elements be up to 30 atomic %. When the intended effect is manifested at an additive element content of up to 5 atomic %, it is preferred that the additive element content be 1 to 5 atomic %.

It is preferred that the thickness of the recording layer of the present invention be 20 to 100 nm, especially 25 to 60 nm. When a protective film is formed on the surface of the recording layer as described hereinafter, the thickness of the recording layer may be 5 to 100 nm. In this case, therefore, the total thickness of the recording layer and the protective film is larger than 5 nm.

The position of the high Se content portion may be in the vicinity of the surface of the recording layer or in the vicinity of the interface between the recording layer and the substrate, and this high Se content portion need not be present in such surface or interface. Namely, the high Se content portion may be located at a position slightly inner than the surface or interface. In this case, it is preferred that the central position of the thickness of the high Se content portion be located up to 10 nm apart from the surface of the recording layer or up to 15 nm apart from the interface between the recording layer and the substrate.

The present invention will now be described in detail with reference to the following example.

As shown in FIG. 1, a substrate 1 comprising a doughnut-like chemically reinforced glass having a thickness of about 1 mm, an outer diameter of 300 mm and an inner diameter of 35 mm and a replica of a tracking groove having a thickness of about 20 μm, which is formed on the reinforced glass from an ultraviolet ray hardening resin, is attached to a rotary shaft 2 in a vacuum deposition apparatus and is rotated at 120 rpm. In order to illustrate the structure below the substrate, the substrate is not shown in the drawings but the position of the substrate is indicated by a dot line. Two vacuum deposition boats 3 and 4 whose centers are arranged below the portion of the disc substrate on which informations are to be recorded, so that they are located on one circle below the disk substrate. Masks 5 and 6 which have slits expanded in the shape of a fan having the center of rotation as the center of the fan, are disposed above the boats. General shutters 7 and 9 entirely covering the slits are disposed above the masks. The shutters co-operate with each other to simultaneously open or close the slits. Angle shutters 8 and 8' are disposed above the shutters so that they can move by a preset angle at a predetermined speed. Vanes 10 and 11 are attached to the angle shutters to prevent reduction of the bonding force at the subsequent bonding step by adhesive of a vacuum-deposited film to the outermost periphery of the disc. Vacuum deposition is prevented on the inner circumference portion of the disc by a metal disc 12 attached just below the disc. Only the position of the metal disc 12 is indicated by a dot line in the drawings. Te is charged into one of the two boats, and Se is charged in the other boat. Each of the boats is composed of tantalum. In order to prevent adhesion of drops or small masses of the starting material to the substrate, there is adopted a boat-structure in which the source to be vacuum-deposited cannot directly be seen from the portion of the disc substrate on which vacuum deposition is to be effected. An electric current is caused to flow through the boats while the disc is being rotated, and the materials in the boats are evaporated. The amounts of the materials evaporated are determined by depositing the evaporated materials on quartz crystal oscillator type film thickness monitors 15 and 16 through holes 13 and 14 formed through the masks 5 and 6. Namely, the deposition speeds are calculated from the amounts deposited on the quartz crystals, and the electric currents to be supplied to the boats are controlled so that constant deposition speeds can be obtained. The ratio of the speeds of deposition on the disc from the respective boats is determined by the opening angles of the angle shutters.

Figure 2:
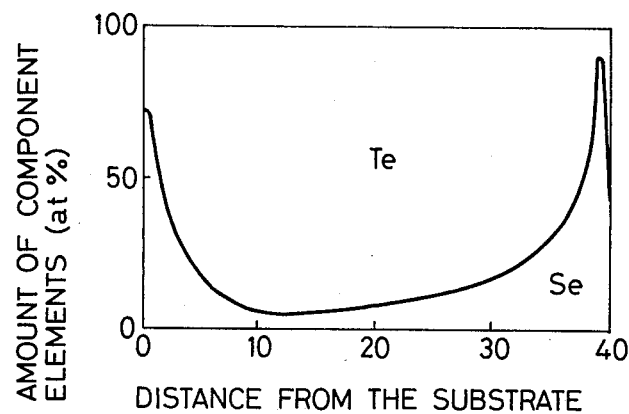
FIG. 2 is a diagram illustrating the change of the composition in the thickness direction in one embodiment of the recording layer of the present invention.

After the general shutters are opened, the angle shutters are controlled and a recording layer having a thickness of 40 nm and a composition gradient as shown in FIG. 2 is formed by vacuum deposition. Then, the general shutters are closed to complete the step of vacuum deposition.

Figure 3:
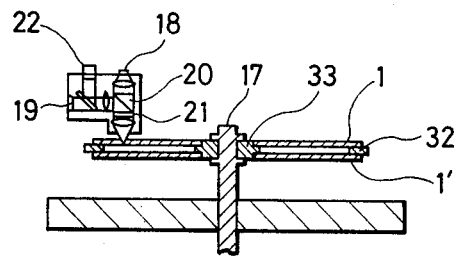
FIG. 3 is a diagram illustrating an example of the recording and reproducing apparatus in which one embodiment of the recording member of the present invention is used.

The disc substrate 1 having the recording layer thus formed thereon by vacuum deposition and bonded to another chemically reinforced glass 1' (putting inner and outer spacers between them) as shown in FIG. 3. At this bonding step, the substrate is arranged so that the recording layer is sealed on the inner side. However, in case of sample discs to be subjected to the life test, bonding is not completely accomplished but the recording layer is brought into contact with outer air, so that the test time may be shortened. Each spacer is composed of aluminum. Even if bonding is completely accomplished, water in air is gradually intruded into the disc through the adhesive layer.

When recording is performed by using the so prepared recording member, as shown in FIG. 3, the recording member is attached to the recording device and is rotated around a rotation shaft 17 at a rotation number of 240 min$^{-1}$. A semiconductor laser 18 having a beam wavelength of 830 nm and an output power of 15 mW is used as the recording light source. While the groove is tracked by signals from a tracking detector 19, laser beams modulated by digital signals are concentrated at a pulse width of 100 ns on the recording layer beyond the substrate through a polarizing prism 20 in a read-out head, a ¼ wavelength plate 21 and a lens. Automatic focussing is performed by signals from a detector 22. A hole having a diameter of about 0.8 μm is formed on the laser beam-irradiated area.

Reading of the recorded information is carried out in the following manner. The disc is rotated at a rotation number of 240 min$^{-1}$, and the same semiconductor laser beams as used for recording, in which the output power is reduced to 5 mW, are applied to the recording layer beyond the substrate. The change of the intensity of the reflected rays is detected by the detector 22 for the automatic focussing to obtain reproduced signals. An error rate at the reading step is about $4 \times 10^{-6}$.

When the thickness of the high Se content portion is changed and made larger than 5 nm, a change is caused in the film structure within about 1 month. When the thickness is reduced below 1 nm, at the accelerated life test conducted at room temperature (25° C.) and a relative humidity of 95%, the percent transmission of beams of the semiconductor laser having the above-mentioned wavelength exceeds 30 % in about 1.5 months and the recording sensitivity is degraded.

When the average Se content is gradually changed at a constant rate in the thickness direction while keeping the pattern of the change of the Se content in the thickness direction as it is (if the calculated content exceeds 100 %, the content is regarded as being 100%, and if the calculated peak of the Se content is lower than 50%, it is supposed that the Se content is 50% in a region of 1 nm thickness before and after the peak), if the average Se content is lower than 0.5 atomic %, the percent transmission of the semiconductor laser beams exceeds 30% within 1 week in an atmosphere having a temperature of 25° C. and a relative humidity of 95%, and if the average Se content exceeds 30 atomic %, the film structure is changed within about 1 month from the point of formation of the recording layer and black points and wrinkles appear on the film surface. When the average Se content is in the range of from 10 to 20 atomic %, a high recording sensitivity can be maintained stably.

When the entire thickness of the recording layer is changed, if the entire thickness is smaller than 20 nm, the shape of the holes is disordered and if the entire thickness exceeds 100 nm, adjacent holes interfere with each other and the error rate becomes higher than $10^{-4}$. If the entire thickness of the recording layer is larger than 25 nm, the stability of the shape of holes is increased and if the entire thickness is within a range of from 25 to 60 nm, the error rate is lower than $10^{-5}$.

When the distance of the center of the high Se content portion on the surface side from the surface of the recording layer is changed, if this distance exceeds 10 nm, the sensitivity is reduced by more than 20% in an atmosphere having a temperature of 25° C. and a relative humidity of 95% within about 1 week because of oxidation of the film surface. When the distance of the center of the high Se content portion on the substrate side from the interface between the substrate and the recording layer is changed, if this distance exceeds 15 nm, the sensitivity is reduced by more than 20% in an atmosphere having a temperature of 25° C. and a relative humidity of 95% within about 3 weeks.

When Bi is used instead of Te, the change with the lapse of time in an atmosphere having a temperature of 25° C. and a relative humidity of 95% is more conspicuous and the percent transmission is saturated at 60%. If the relative humidity of the atmosphere is changed to 40%, the change with the lapse of time is generally diminished, but in case of Bi, the speed of the change is higher than in case of Te.

It is preferred that the recording layer of the present invention be formed according to the vacuum deposition method, but there may be adopted a method of deposition in a gas or a sputtering method.

When a protective film is formed directly on the recording member of the present invention, the recording sensitivity is reduced but there can be attained an effect of reducing the speed of the change with the lapse of time. Either an inorganic substance or an organic substance may be used for the protective film. From the viewpoint of decreasing reduction of the sensitivity, it is preferred that an organic substance having a low melting point (low softening point) be used for the protective film. For example, there may be used a vacuum deposition film of a paraffinic hydrocarbon or a coating film of a ketone resin. Furthermore, a film composed mainly of at least one element selected from Te, Se and S may be used.

When an appropriate additive element is incorporated in the recording layer of the present invention, the SN ratio is improved on recording of video signals, and other advantages such as improvement of the heat resistance can also be attained. As such additive element, there can be mentioned Si, Ge, As, Tl, Sn, Pb, In, Sb and Ta. For example, if 4% of Te is substituted by As or 5% of Te is substituted by Pb by incorporating such element into the Te evaporation source, the SN ratio can be improved in the reproduced signals. In case of Pb, since Pb can be evaporated singly from a different evaporation source and can be vacuum-deposited simultaneously with Te and Se, precise control of the composition can be accomplished very easily.

As will be apparent from the foregoing description, in the recording member of the present invention, high sensitivity and high stability can be obtained, and the recording layer film can be formed very easily with good reproducibility. Accordingly, great advantages can be attained by the present invention.

What is claimed is:

1. A recording member for recording informations, which comprises a substrate and a recording layer formed on the substrate, which is deformed or removed under irradiation with energy beams, wherein said recording layer contains at least selenium and at least one element selected from the group consisting of tellurium and bismuth, and the selenium content is higher in the vicinity of the surface of the recording layer and/or the vicinity of the interface between the recording layer and the substrate than the average selenium content in other portions and wherein the thickness of the high selenium content portion is 1 to 5 nm, whereby oxidation of said recording layer is decreased to provide a more stable recording member.

2. A recording member as set forth in claim 1, wherein in the high selenium content portion, the selenium content is 50 to 100 atomic %.

3. A recording member as set forth in any of claims 1 through 2, wherein the high selenium content portion is formed either in the vicinity of the surface of the recording layer or in the vicinity of the interface between the substrate and the recording layer.

4. A recording member as set forth in claim 3, wherein the high selenium content portion formed in the vicinity of the surface of the recording layer is located on the inner side from the surface and the distance of the center of said high selenium content portion from the surface is up to 10 nm.

5. A recording member as set forth in claim 3, wherein the high selenium content portion formed in the vicinity of the surface of the recording layer is located in the surface of the recording layer.

6. A recording member as set forth in claim 3, wherein the high selenium content portion formed in the vicinity of the interface between the substrate and the recording layer is located on the inner side from said interface and the distance of the center of the high selenium content portion from said interface is up to 15 nm.

7. A recording member as set forth in claim 3, wherein the high selenium content portion formed in the vicinity of the interface and the recording layer is located in said interface.

8. A recording member as set forth in any of claims 1 through 2, wherein the high selenium content portion is formed only in the vicinity of the surface of the recording layer.

9. A recording member as set forth in claim 9, wherein the high selenium content portion formed in the vicinity of the surface of the recording layer is located on the inner side from the surface and the distance of the center of said high selenium content portion from the surface is up to 10 nm.

10. A recording member as set forth in claim 8, wherein the high selenium content portion formed in the vicinity of the surface of the recording layer is located in the surface of the recording layer.

11. A recording member as set forth in any of claims 1 through 2, wherein the high selenium content portion is formed only in the vicinity of the interface between the substrate and the recording layer.

12. A recording member as set forth in claim 11, wherein the high selenium content portion formed in the vicinity of the interface between the substrate and the recording layer is located on the inner side from said interface and the distance of the center of the high selenium content portion from said interface is up to 15 nm.

13. A recording member as set forth in claim 11, wherein the high selenium content portion formed in the vicinity of the interface is located in said interface.

14. A recording member as set forth in claim 1, wherein the average selenium content in the recording layer is 0.5 to 30 atomic %.

15. A recording member as set forth in any of claims 1 through 2, wherein the thickness of the recording layer is 5 to 10 nm.

16. A recording member as set forth in claim 15, wherein the thickness of the recording layer is 20–100 nm.

17. A recording member as set forth in claim 16, wherein the thickness of the recording layer is 25–60 nm.

18. A recording member as set forth in claim 15, wherein said recording layer has a protective film on the surface thereof not adjacent said substrate.

19. A recording member as set forth in any of claims 1 through 2, wherein the recording layer contains at least tellurium and selenium.

20. A recording member as set forth in any of claims 1 through 2, wherein the recording layer contains up to 30 atomic % of at least one additive element selected from the group consisting of silicon, germanium, arsenic, thallium, tin, lead, indium, antimony and tantalum.

21. A recording member as set forth in claim 20, wherein the content of said additive element is 1 to 5 atomic %.

22. A recording member as set forth in any of claims 1 through 2, wherein the recording layer contains up to 30 atomic % of lead.

23. A recording member as set forth in claim 22, wherein the lead content is 1 to 5 atomic %.

24. A recording member as set forth in claim 1, wherein the content of the selenium in said high selenium content portion is 50 to 100 atomic %, and wherein the average selenium content in the recording layer is 0.5 to 30 atomic %.

25. A recording member as set forth in any one of claims 1 through 2, wherein the average Se content in the recording layer is 10 to 20 atomic %.

26. A recording member as set forth in any one of claims 1 through 2, wherein the Se content of the portions of the recording layer other than said high selenum content portion is 0–29.8 atomic %.

27. A recording member as set forth in claim 26, wherein the Se content of the portions other than the high selenium content portion is greater than 0 atomic % but lower than 29.8 atomic %.

* * * * *